(12) United States Patent
Guan

(10) Patent No.: US 8,055,793 B2
(45) Date of Patent: Nov. 8, 2011

(54) METHOD AND APPARATUS FOR REDUCING DELAY OF MEDIA PLAYING

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 12/393,627

(22) Filed: Feb. 26, 2009

(65) Prior Publication Data

US 2009/0164656 A1 Jun. 25, 2009

Related U.S. Application Data

(63) Continuation of application No. PCT/CN2007/071309, filed on Dec. 21, 2007.

(30) Foreign Application Priority Data

Dec. 31, 2006 (CN) .......................... 2006 1 0171596

(51) Int. Cl.
*G06F 15/16* (2006.01)
*G06F 15/173* (2006.01)

(52) U.S. Cl. ........................ 709/241; 709/231; 709/232

(58) Field of Classification Search ........................ None
See application file for complete search history.

(56) References Cited

U.S. PATENT DOCUMENTS

| 6,084,581 | A  | * | 7/2000  | Hunt .............................. 715/202 |
| 6,788,315 | B1 | * | 9/2004  | Kekic et al. .................... 715/733 |
| 6,874,017 | B1 | * | 3/2005  | Inoue et al. .................... 709/217 |
| 7,146,429 | B2 | * | 12/2006 | Michel ........................... 709/238 |
| 7,272,645 | B2 | * | 9/2007  | Chang et al. ................... 709/223 |
| 7,277,942 | B2 | * | 10/2007 | Inoue et al. .................... 709/225 |
| 7,418,454 | B2 | * | 8/2008  | Chen et al. ........................... 1/1 |
| 7,526,564 | B2 | * | 4/2009  | Guo et al. ...................... 709/231 |

(Continued)

FOREIGN PATENT DOCUMENTS

CN 1622548 A 6/2005

(Continued)

OTHER PUBLICATIONS

International Search Report in International Application No. PCT/CN2007/071309.

(Continued)

*Primary Examiner* — David England
(74) *Attorney, Agent, or Firm* — Finnegan, Henderson, Farabow, Garrett & Dunner LLP

(57) ABSTRACT

A method for reducing delay of playing media includes: a user node obtaining information on a list of nodes that can provide a desired program content; selects a best node among the nodes that can provide the program content corresponding to one or more time segments, wherein the program content is to be played in more than one time segment and the best node is closest to the user node among all the nodes; creating a connection with the selected best node; receiving media stream data of the program content from the best node; and playing the media stream data. An apparatus for reducing delay of media playing herein includes: a node information obtaining module, a best node selecting module, a connection creating module, and a playing module.

14 Claims, 4 Drawing Sheets

U.S. PATENT DOCUMENTS

| | | | |
|---|---|---|---|
| 7,555,561 B2 * | 6/2009 | Michel | 709/238 |
| 7,689,510 B2 * | 3/2010 | Lamkin et al. | 705/51 |
| 2002/0178261 A1 | 11/2002 | Chang et al. | |
| 2003/0099237 A1 * | 5/2003 | Mitra et al. | 370/393 |
| 2004/0039934 A1 * | 2/2004 | Land et al. | 713/200 |
| 2004/0054805 A1 * | 3/2004 | Sen et al. | 709/240 |
| 2005/0204042 A1 * | 9/2005 | Banerjee et al. | 709/226 |
| 2006/0026117 A1 * | 2/2006 | Raman et al. | 707/1 |
| 2006/0159109 A1 * | 7/2006 | Lamkin et al. | 370/401 |
| 2006/0218167 A1 * | 9/2006 | Bosley et al. | 707/100 |
| 2006/0230107 A1 * | 10/2006 | Yu et al. | 709/204 |
| 2007/0005694 A1 * | 1/2007 | Popkin et al. | 709/204 |
| 2007/0064702 A1 * | 3/2007 | Bates et al. | 370/392 |
| 2007/0112803 A1 * | 5/2007 | Pettovello | 707/100 |
| 2007/0156855 A1 * | 7/2007 | Johnson | 709/219 |
| 2007/0168336 A1 * | 7/2007 | Ransil et al. | 707/3 |
| 2007/0263984 A1 * | 11/2007 | Sterner et al. | 386/95 |
| 2007/0294622 A1 * | 12/2007 | Sterner et al. | 715/716 |
| 2008/0033911 A1 * | 2/2008 | Raman et al. | 707/2 |
| 2008/0130516 A1 * | 6/2008 | You et al. | 370/254 |
| 2009/0164656 A1 * | 6/2009 | Guan | 709/231 |
| 2009/0210528 A1 * | 8/2009 | Swildens et al. | 709/224 |
| 2009/0327489 A1 * | 12/2009 | Swildens et al. | 709/224 |
| 2010/0125649 A1 * | 5/2010 | Day et al. | 709/219 |

FOREIGN PATENT DOCUMENTS

| | | |
|---|---|---|
| CN | 1885812 A | 12/2006 |
| CN | 101005606 A | 7/2007 |
| WO | WO 2005/076553 A1 | 8/2005 |

OTHER PUBLICATIONS

Liu, Xin et al., "A Peer-to-Peer Framework for Cost-Effective On-Demand Media Streaming", Consumer Communications and Networking Conference, 2006. IEEE Las Vegas, NV, USA Jan. 8-10, 2006, IEEE, vol. 1, Jan. 8, 2006, pp. 314-318.

Mushtaq, Mubashar et al., "Adaptive Packet Video Streaming Over P2P Networks Using Active Measurements", Proceedings of the 11$^{th}$ IEEE Symposium on Computers and Communications (ISCC '06), Cagliari, Italy, Jun. 26-29, 2006, IEEE, Jun. 26, 2006, pp. 423-428.

Hei, Xiaojun et al., "A Measurement Study of a Large-Scale P2P IPTV System", Department of Computer and Information Science; Department of Electrical and Computer Engineering, Polytechnic University, Brooklyn, NY, USA, pp. 1-15.

PCT International Preliminary Report on Patentability, issued Jun. 30, 2009, which includes an English Translation of Written Opinion of the International Searching Authority in PCT Application No. PCT/CN2007/071309 mailed Mar. 6, 2008, which is attached as a reference, 6 pgs.

European Communication pursuant to Rule 62 EPC, dated Dec. 11, 2009, which includes the supplementary European Search Report (Art. 153 (7) EPC) and the European search opinion for Application No. 07 84 6135 dated Dec. 7, 2009, 10 pgs.

Chinese Office Action dated Aug. 14, 2009, issued in related Chinese Application No. 2006101715967, filed Dec. 31, 2006.

Xiaojun Hei et al., A Measurement Study of a Large-Scale P2P IPTV System, IEEE Transaction on Multimedia, vol. 9, No. 8, pp. 1672-1687, Dec. 2007 (16 pages).

\* cited by examiner

METHOD AND APPARATUS FOR REDUCING DELAY OF MEDIA PLAYING

This is a continuation of International Application No. PCT/CN2007/071309, filed Dec. 21, 2007, which claims the benefit of priority to the Chinese Patent Application No. 200610171596.7, filed with the Chinese Patent Office on Dec. 31, 2006, and entitled "A Method and Apparatus for Reducing Delay of Media Play", the contents of both of which are incorporated herein by reference in their entirety.

FIELD OF THE INVENTION

The present invention relates to the streaming media field, and in particular, to a method and apparatus for reducing delay of media playing.

BACKGROUND

The streaming technology is a technology which can transfer multimedia data streams over IP network. In the traditional play technology, the client downloads a complete file from the server for playing. The streaming technology utilizes streaming transmission, divides the whole multimedia file into multiple compressed packets, and transmits the compressed packets to the client sequentially in real time. The user may decompress the arriving packets while downloading subsequent compressed packets, thus saving time. With the development of computer technologies, the streaming technology is more and more widely applied to Video On Demand (VOD). The VOD technology converts a recorded video program into a digital video file directly playable on a computer through a series of processes such as capture and compression, and stores the file on a web server, thus being available for users. The user watches the video and audio programs of the video service provider through a terminal device, and can play the program forward, backward, or pause the program while watching the program. VOD service is characterized by celerity, convenience and interaction. With the increase of network bandwidth, the VOD service is more and more promising. The development of the Internet Protocol Television (IPTV) spurs the popularity of applying the streaming technology.

When the VOD media data are transmitted in IPTV system, the traditional streaming system exposes many problems. The VOD imposes an excessive impact on the server of the IPTV, which tends to cause a single-point failure. Therefore, a Content Delivery Network (CDN) technology is introduced. The essence of the CDN technology is to push the content from the center to the edge nearby the user, thus effectively improving the Quality of Service (QoS) of the content and relieving the pressure on the central devices and backbone networks. Through the CDN technology, the content service changes from a single central structure to a distributed structure. When the user clicks the program, the desired media content can be obtained from the edge server nearby the user. The user obtains resources from the same edge server when playing fast forward/backward and jumping forward/backward.

With the rapid development of the Peer-to-Peer (P2P) technology in recent years, the P2P technology is more and more applied to the streaming service, for example, the P2P-based streaming software such as PPLive and PPStream. By virtue of the characteristics of the P2P, the user node acts as a server for providing contents and sharing the load of servers, thus enhancing the extensibility of the system and making the media data more distributed. In the current streaming system based on P2P, each node sends the received content to other nodes while receiving the content. Therefore, the content provided by each node to other nodes varies with the content watched by the node. Consequently, in order to create a TCP connection, the user has to search for the corresponding program source again while playing the media fast forward/backward, or jumping forward/backward.

FIG. 1 is a schematic diagram of PPLive streaming software. When the user drags the progress bar of the media during play, the user needs to query the user list on the central server first, and then creates a corresponding TCP connection with the relevant node to play the media according to the current play conditions. This prolongs the delay of playing the media, and disregards the proximity between nodes. Meanwhile, the central server needs to keep updating the content provided by each node, thus increasing the load of the central server. Moreover, each user node stores only a small portion of media contents. In this case, if a user wants to access a complete program, the user has to access multiple user nodes before obtaining the complete resources. When the user plays fast forward and fast backward or drags the progress bar, the user may need to span different nodes which provide program contents, search for the program source again and create a TCP connection, which further prolong the delay of playing the media.

After the user drags the progress bar of the media in a CDN-based network, the user still obtains the resources from the same server, and does not need to search the server again or create a TCP connection. Therefore, the play delay is about 2-3 seconds. However, after the user drags the progress bar in a P2P-based network, the user needs to search the server again and create a TCP connection, and the play delay is over 5 seconds if the buffer time of play is considered, which is unacceptable to the user.

SUMMARY

A method and an apparatus for reducing delay of media playing is disclosed in an embodiment of the present disclosure to overcome the play delay caused by handover between nodes when the user drags the progress bar in the process of playing a P2P-based streaming program.

The embodiments of the present disclosure are fulfilled through the following technical solution.

A method for reducing delay of media playing includes the following:

obtaining, by a user node, information on a list of nodes that can provide desired program contents;

selecting a best node among all the nodes that can provide a program content corresponding to each time segment, where the program content is played in more than one time segment and the best node is closest to the user node among all the nodes; and creating a connection with the best node selected on each time segment respectively, receiving media stream data of the program content from the best node, and playing the media stream data.

An apparatus for reducing delay of media playing includes the following:

a node information obtaining module, adapted to obtain information on a list of nodes that can provide program contents desired by a user node;

a best node selecting module, adapted to select a best node among all the nodes that can provide a program content corresponding to each time segment, where the program content is played in more than one time segment and the best node is closest to the best node selecting module among all the nodes;

a connection creating module, adapted to create a connection with the selected best node; and a playing module, adapted to receive media stream data of the program content from the best node, and play the media stream data.

The technical solution under the present disclosure reveals that in an embodiment of the present disclosure, a best node is selected for providing program content, thus enhancing the QoS of the VOD greatly; the user node creates a TCP connection with the best node in the local node list beforehand, thus reducing delay of playing the streaming media significantly when the user drags the progress bar.

DETAILED DESCRIPTION

The present invention is hereinafter described in detail by reference to preferred embodiments and accompanying drawings, which, however, are not intended to limit the present invention.

The P2P technology is characterized in that the user receives contents while providing contents for others. Therefore, in an embodiment of the present invention, two buffers are set on the user node. One buffer is defined as a receiving buffer, adapted to receive and buffer media stream data for playing, and the other is defined as a shared buffer, adapted to provide media services for other nodes. Moreover, the shared buffer stores the program contents available to other sub-nodes, where the program contents remain unchanged in a rather long time. After the program contents stored in the shared buffer of the user node are registered onto the P2P network, the user does not need to search again when dragging the progress bar during the play, or spend extra time in tracing the dynamic buffer change of the node.

When the user node wants to play a program content on demand in an embodiment of the present invention, the user node obtains a list of nodes which can provide the program content from the Distributed Hash Table (DHT) network or the central server, and then selects the best node from such nodes. If many other user nodes are also able to provide the program content, performance is compared among such nodes, and, through Round Trip Time (RTT) measurement, a node closest to one of the foregoing user nodes is selected for providing the program content. The information about such user nodes is stored onto the local node list of the selected user node, and a TCP connection is created with all the nodes that provide the program content beforehand for the purposes of keeping communication with other user nodes and saving time when the user drags the progress bar of play.

Figure 1:
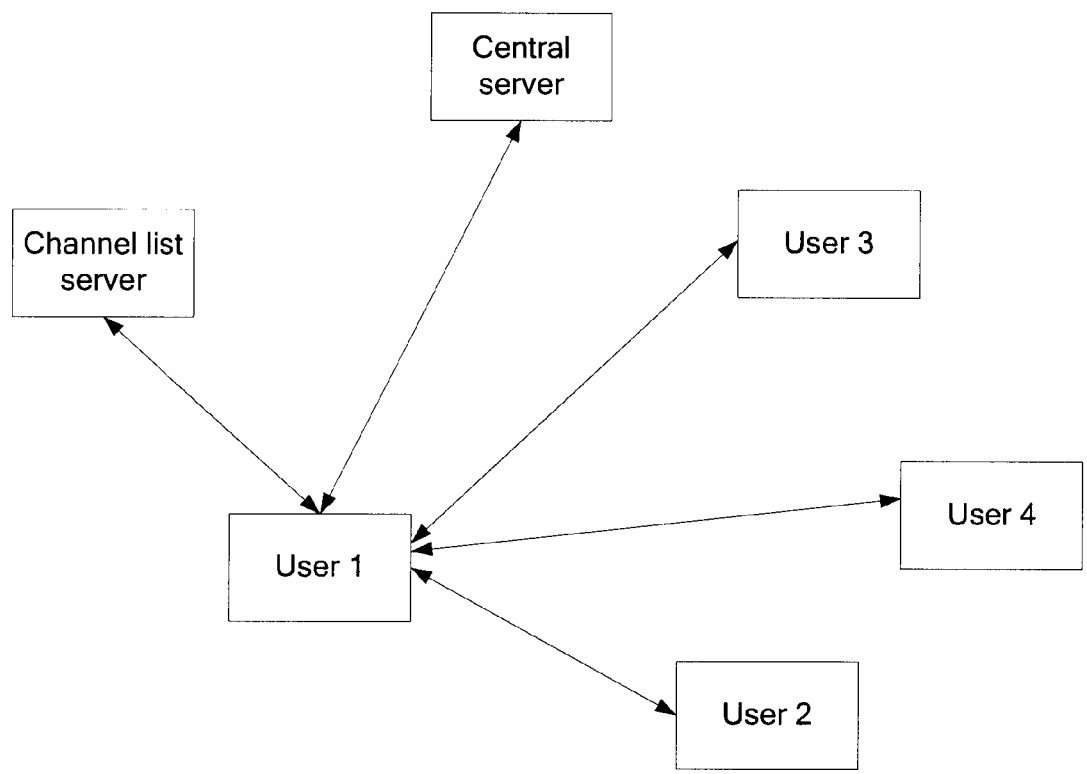
FIG. 1 is a schematic diagram of PPLive streaming software in the prior art.
Figure 2:
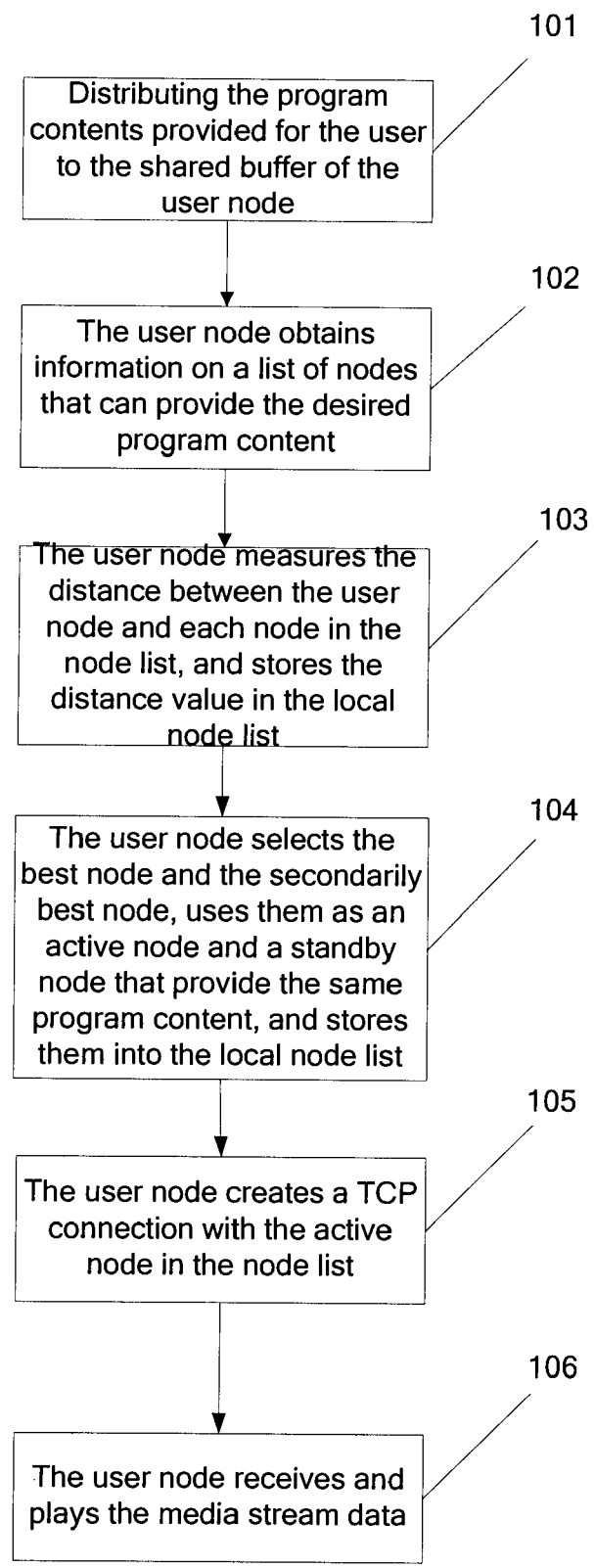
FIG. 2 is a flowchart of a method for reducing delay of media playing in an embodiment of the present disclosure.

The method for reducing delay of media playing when a user plays a program through VOD in an embodiment of the present invention is expounded below. As shown in FIG. 2, the method includes the following steps:

Step 101: The information on the program contents available to each user node is delivered to the shared buffer of each user node.

The program contents may be delivered by a super node. The principles of delivery include that the program contents are delivered to the user nodes which are online in a long period and relatively stable.

Step 102: Through a DHT network or central server, the user node obtains a list of nodes which contain the program content when the user node needs to play a program content.

Step 103: Through the RTT measurement, the user node measures the distance to each node which contains the same program content in the node list, and stores the distance value into the local node list of the user node, where the distance value serves as data for measuring proximity between the nodes.

The RTT measurement may be performed through ping packet commands or application-layer measurement messages.

Step 104: The user node selects the best node and the secondarily best node among all the nodes that can provide the program content corresponding to each time segment according to the distance parameter in the local node list, where the program content is played in more than one time segment. The best node is closest to the user node, and the secondarily best node is secondarily closest to the user node among all the nodes. Afterwards, all the best nodes serve as active nodes that provide the program content in each time segment, and all the secondarily best nodes serve as standby nodes that provide the same program content, and they are stored together into the local node list of the user node.

Step 105: The user node creates a TCP connection with each active node in the local node list. When an active node goes offline, the user node creates a TCP connection with the standby node of the offline active node, or searches for a new active node to replace the offline active node and creates a TCP connection with it.

Step 106: Through a receiving buffer, the user node receives the media stream data from the active node and plays the media stream data.

When the user drags the progress bar of play in each time segment of a program content, because the user node has created a TCP connection with the active node of each time segment, the user node can receive the media stream data quickly from the active node or standby node corresponding to the reselected time segment after the drag operation, thus shortening the delay caused by handover.

In order to make the technical solution of this embodiment clearer, the embodiment is detailed below with the following examples.

Figure 3:
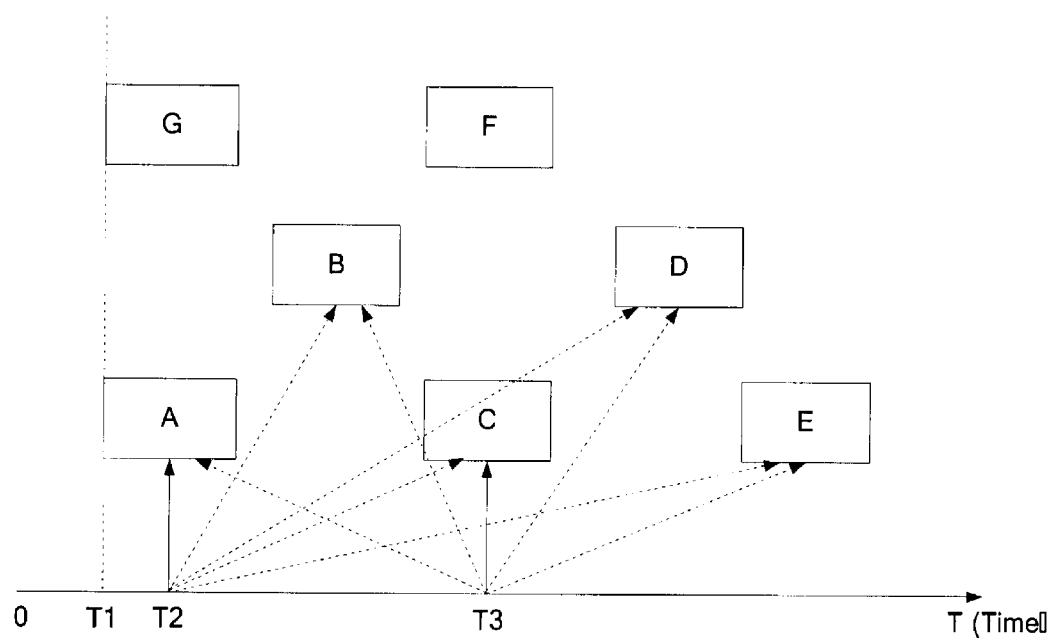
FIG. 3 shows how a user drags a progress bar of play in an embodiment of the present disclosure.

FIG. 3 shows how a user drags a progress bar of play. In FIG. 3, five continuous nodes A, B, C, D and E make up the complete media data of a VOD program. Nodes G and F have the same program content with nodes A and C. The distance from nodes G and F to the current user node is greater than the distance from nodes A and C to the current user node, and nodes G and F serve as standby nodes of nodes A and C. Table 1 is a local node list stored on the current user node. The metric value is obtained through a measured value of RTT or is directly denoted by measured time of RTT.

TABLE 1

| Active node | Metric | Standby node | Metric |
|---|---|---|---|
| A | 2 | G | 4 |
| B | 3 | | |
| C | 3 | F | 5 |

TABLE 1-continued

| Active node | Metric | Standby node | Metric |
|---|---|---|---|
| D | 2 | | |
| E | 3 | | |

At time T1, the user watches the program; at time T2, the user watches the resources provided by node A (indicated by solid line arrowhead in FIG. 3), and a TCP pre-connection (indicated by dotted line arrowhead in FIG. 3) is created between the user node and nodes B, C, D, and E respectively, and is called a "keep-alive connection" status. When the user skips from time T2 to time T3 directly, namely, when the user drags the progress bar, the content is provided by node C. Because the user node has created a TCP connection with node C, the user node obtains resources from node C directly, thus saving the time for searching and creating a TCP connection and changing the connection with node A to a keep-alive connection status. When a node fails, the user may create a TCP connection with the standby node which contains the same program content. If no standby node exists, the user searches for the active node and standby node again through the DHT network or server. When the user begins playing the VOD program, if the node in the node list obtained from the P2P network is unable to provide complete VOD contents (for example, in FIG. 3, only four nodes A, B, D and E are obtained, and node C is not obtained for certain reasons such as abrupt disconnection), the user can search the P2P network for program sources intermittently during the VOD play. If a new node which provides the program content is searched out, the user can further search for the best node, and add the best node into the local node list and create a TCP connection.

The best node and the secondarily best node can be found not only through the RTT measurement method, but also by calculating the number of hops of the route based on the following principles: The user node calculates out the number of hops of the route between the user node and all other nodes which contain the same program content in every time segment, and finds two nodes (namely, the best node and the secondarily best node) according to the number of hops of the route, where the two nodes contain the same program content in every time segment, the number of hops along the route between the user node and one of the two nodes is the least, and the number of hops along the route between the user node and the other node is the second least. The method for reducing delay of media playing by calculating the number of hops of the route is exactly the same as that in the foregoing embodiment, and is not repeated here any further.

Figure 4:
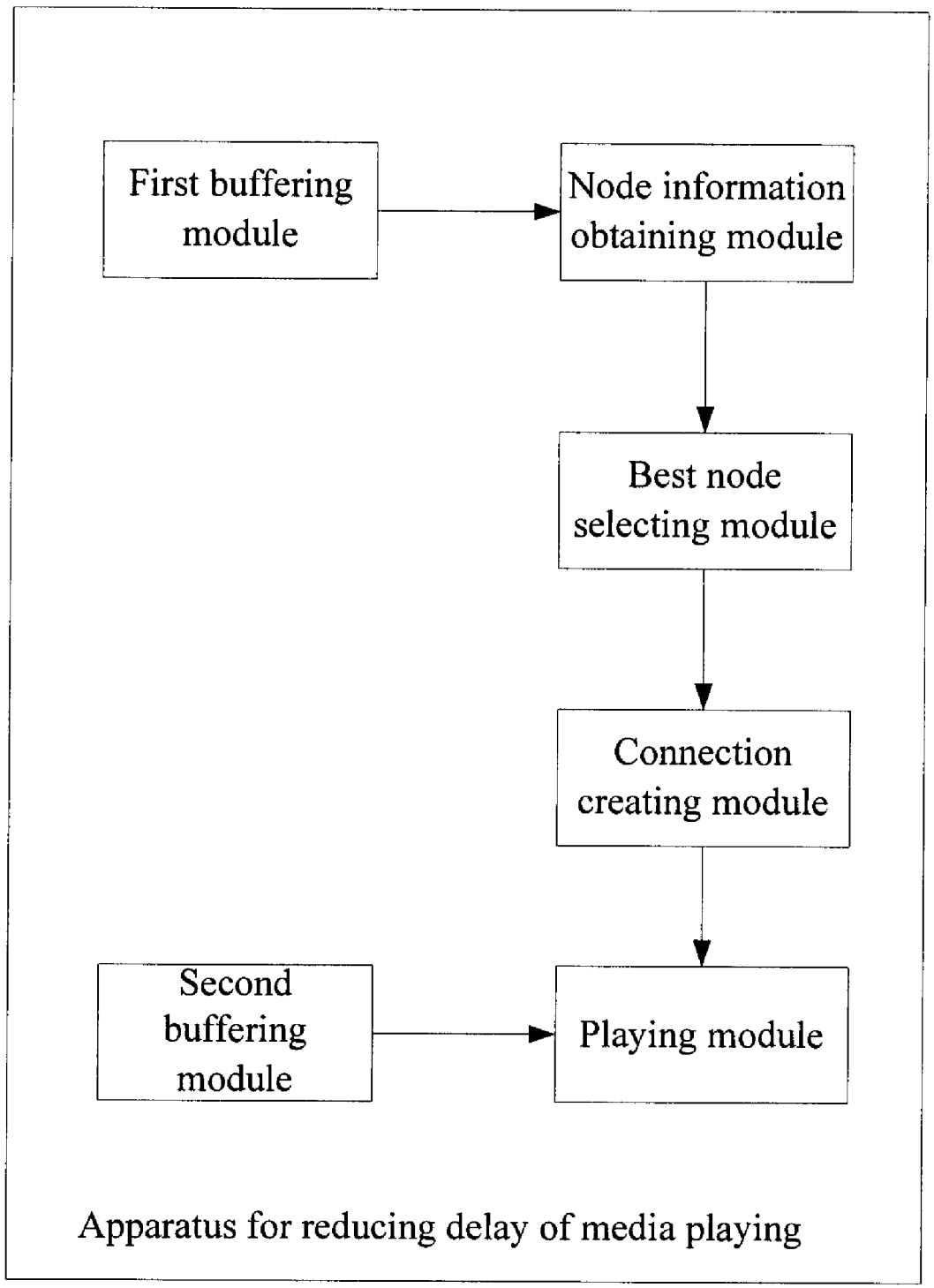
FIG. 4 shows a structure of an apparatus for reducing delay of media playing in an embodiment of the present disclosure.

As shown in FIG. 4, an apparatus for reducing delay of media playing in an embodiment of the present invention includes:

a node information obtaining module, adapted to obtain a list of all nodes that can provide a desired program content through a DHT network or central server;

a best node selecting module, adapted to: select a best node and a secondarily best node among all the nodes that can provide the same program content corresponding to each time segment, where the program content is played in more than one time segment, the best node is closest to the best node selecting module among all the nodes, and the secondarily best node is the secondarily closest to the best node selecting module among all the nodes; and store the best node locally as an active node and store the secondarily best node locally as a standby node in each time segment;

a connection creating module, adapted to: create a TCP connection with each active node stored locally; and create a TCP connection with the standby node corresponding to the active node when the TCP connection with the active node fails for reasons such as failure of the active node; and a playing module, adapted to: receive media stream data of the program content from the best node or standby node, and play the media stream data.

The apparatus may further include:

a first buffering module, adapted to store program contents that can be provided for other nodes, and provide media services for other nodes; and a second buffering module, adapted to store the received media stream data.

Although the invention has been described through some preferred embodiments, the invention is not limited to such embodiments. It is apparent that those skilled in the art can make various variations and substitutions to the invention without departing from the spirit and scope of the invention. The invention is intended to cover the variations and substitutions provided that they fall in the scope of protection defined by the claims or their equivalents.

What is claimed is:

1. A method for reducing delay of media playing, comprising:
    obtaining, by a user node, information on a plurality of nodes, each of the plurality of nodes providing at least a portion of a program content, wherein the program content is to be played in a sequence of time segments;
    selecting a list of best nodes corresponding to the sequence of time segments, wherein for each of the time segments of the sequence, a corresponding best node, which is closest to the user node among nodes that can provide the program content in the time segment, is selected into the list;
    creating a plurality of keep-alive connections with the list of best nodes, wherein the keep-alive connections are TCP pre-connections that keep communication active between the list of best nodes and the user node;
    receiving media stream data of the program content from a best node corresponding to a selected time segment from the list of best nodes; and
    playing the media stream data received from the best node corresponding to the selected time segment.

2. The method for reducing delay of media playing according to claim 1, wherein the step of obtaining information on a plurality of nodes comprises:
    obtaining, by the user node, the information on the plurality of nodes through a Distributed Hash Table (DHT) network or a central server.

3. The method for reducing delay of media playing according to claim 1, further comprising:
    measuring, by the user node, a distance between the user node and each of the nodes that can provide the program content corresponding to each time segment by measuring round-trip time, selecting two nodes closest to the user node, using the closest node as an active node on each time segment and using the secondarily closest node as a standby node on each time segment, and storing the active node and the standby node locally.

4. The method for reducing delay of media playing according to claim 3, further comprising:
    creating, by the user node, a connection with each active node stored locally; and
    creating a connection with each standby node corresponding to the active node when the connection between the user node and the active node fails.

5. The method for reducing delay of media playing according to claim 4, further comprising:
  receiving, by the user node, the media stream data from the active node or standby node which is already connected with the user node and corresponds to a reselected time segment after the user node reselects a time segment among more than one time segment of the program content.

6. The method for reducing delay of media playing according to claim 1, further comprising:
  calculating, by the user node, a distance between the user node and each of the nodes that can provide the program content corresponding to each time segment through a number of hops of a route, selecting two nodes with a least and a secondarily least number of hops of the route away from the user node, using the node with the least number of hops as an active node and using the node with the secondarily least number of hops as a standby node on each time segment, and storing the active node and standby node locally.

7. The method for reducing delay of media playing according to claim 6, further comprising:
  creating, by the user node, a connection with each active node stored locally; and
  creating a connection with each standby node corresponding to the active node when the connection between the user node and the active node fails.

8. The method for reducing delay of media playing according to claim 7, further comprising:
  receiving, by the user node, the media stream data from the active node or standby node which is already connected with the user node and corresponds to a reselected time segment after the user node reselects a time segment among more than one time segment of the program content.

9. An apparatus for reducing delay of media playing, comprising:
  a node information obtaining module, configured to obtain information on a plurality of nodes, each of the plurality of nodes providing at least a portion of a program content desired by a user node, wherein the program content is to be played in a sequence of time segments;
  a best node selecting module, configured to select a list of best nodes corresponding to the sequence of time segments, wherein for each of the time segments of the sequence, a corresponding best node, which is closest to the user node among nodes that can provide the program content in the time segment, is selected into the list;
  a connection creating module, configured to create a plurality of keep-alive connections with the list of best nodes, wherein the keep-alive connections are TCP preconnections that keep communication active between the list of best nodes and the user node; and
  a playing module, configured to receive media stream data of the program content from a best node from the list of best nodes, wherein the best node corresponds to a selected time segment, and play the media stream data received from the best node corresponding to the selected time segment.

10. The apparatus for reducing delay of media playing according to claim 9, wherein:
  the node information obtaining module obtains the information on the plurality of nodes through a Distributed Hash Table (DHT) network or a central server.

11. The apparatus for reducing delay of media playing according to claim 9, wherein:
  the best node selecting module is further configured to: select a secondarily best node among the nodes that can provide the program content corresponding to each time segment, wherein the secondarily best node is secondarily closest to the best node selecting module among the nodes that can provide the program content; use the best node as an active node on each time segment and use the secondarily best node as a standby node on each time segment, and store the active node and the standby node locally.

12. The apparatus for reducing delay of media playing according to claim 11, wherein:
  the connection creating module is configured to: create a connection with each active node stored locally; and create a connection with the standby node corresponding to the active node when the connection with the active node fails.

13. The apparatus for reducing delay of media playing according to claim 9, wherein:
  the best node selecting module is further configured to: select a secondarily best node among the nodes that can provide the program content corresponding to each time segment, wherein the secondarily best node is secondarily closest to the best node selecting module among the nodes that can provide the program content; use the best node as an active node on each time segment and use the secondarily best node as a standby node on each time segment, and store the active node and the standby node locally.

14. The apparatus for reducing delay of media playing according to claim 13, wherein:
  the connection creating module is configured to: create a connection with each active node stored locally; and create a connection with the standby node corresponding to the active node when the connection with the active node fails.

* * * * *